Aug. 15, 1933.  F. C. HANNAFORD  1,922,129
COMBINED STORAGE AND REFRIGERATION APPARATUS
Filed May 23, 1932  4 Sheets-Sheet 1

Frederick C. Hannaford
INVENTOR

BY Victor J. Evans
and Co. ATTORNEY

Aug. 15, 1933.  F. C. HANNAFORD  1,922,129
COMBINED STORAGE AND REFRIGERATION APPARATUS
Filed May 23, 1932  4 Sheets-Sheet 3

Frederick C. Hannaford
INVENTOR
BY Victor J. Evans
and Co. ATTORNEY

Aug. 15, 1933.  F. C. HANNAFORD  1,922,129
COMBINED STORAGE AND REFRIGERATION APPARATUS
Filed May 23, 1932   4 Sheets-Sheet 4
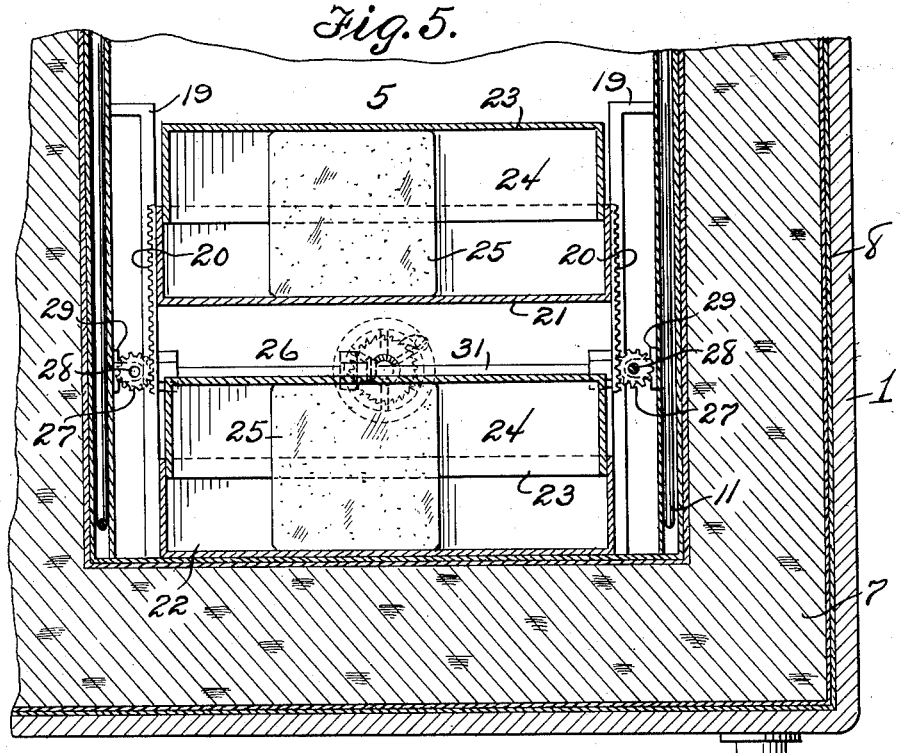
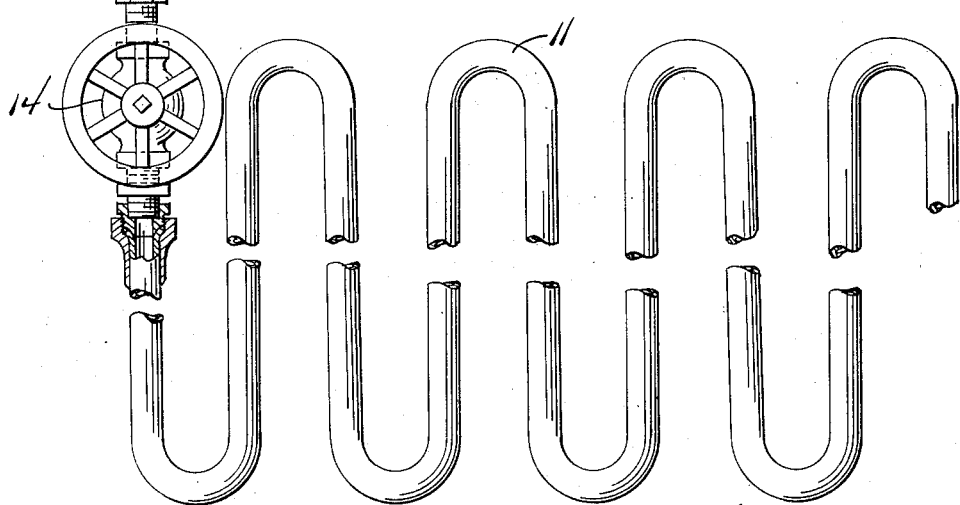
Frederick C. Hannaford
INVENTOR
BY Victor J. Evans & Co.
ATTORNEY Patented Aug. 15, 1933

1,922,129

UNITED STATES PATENT OFFICE 1,922,129

COMBINED STORAGE AND REFRIGERATION APPARATUS

Frederick C. Hannaford, Morgan City, La.

Application May 23, 1932. Serial No. 613,119

2 Claims. (Cl. 62—91.5)

This invention relates to combined storage and refrigeration apparatus and has for the primary object, the provision of means whereby solid carbon dioxide may be efficiently employed as a cooling and freezing medium.

Another object of this invention is the provision of a heat resisting cabinet or casing having independent chambers, one of which may be employed for the storage of solid carbon dioxide and equipped with means whereby the gases or fumes cast off by the solid carbon dioxide may be admitted to other chambers for freezing and cooling purposes.

A further object of this invention is the provision of means for receiving special freezing frames forming the subject-matter of my co-pending application, Serial No. 606,510, filed April 20, 1932, whereby the contents thereof may be frozen to the desired consistency by solid carbon dioxide removed from the storage chamber and placed in said means.

A further object of this invention is the provision of self-adjusting racks to receive therebetween the freezing forms and in which the solid carbon dioxide may be placed that the racks remain in contact therewith during the evaporation of said solid carbon dioxide, whereby the freezing or cooled temperature therefrom will be transmitted by the supporting walls of the racks to the freezing forms.

A further object of this invention is the provision of a convenient and compact means whereby the racks may be easily and quickly adjusted to receive and permit the removal of the freezing frames when desired and also permit the replenishing of the solid carbon dioxide in the racks, when necessary.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation partly in section illustrating a combined storage and refrigeration apparatus constructed in accordance with my invention.

Figure 5 is a fragmentary sectional view taken on the line 5—5 of Figure 4 illustrating the racks positioned with pieces of solid carbon dioxide arranged therein for the purpose of freezing ingredients located between the opposing walls of the racks.

Figures 6 is a detail view partly in section, illustrating a cooling coil.

Figure 1:
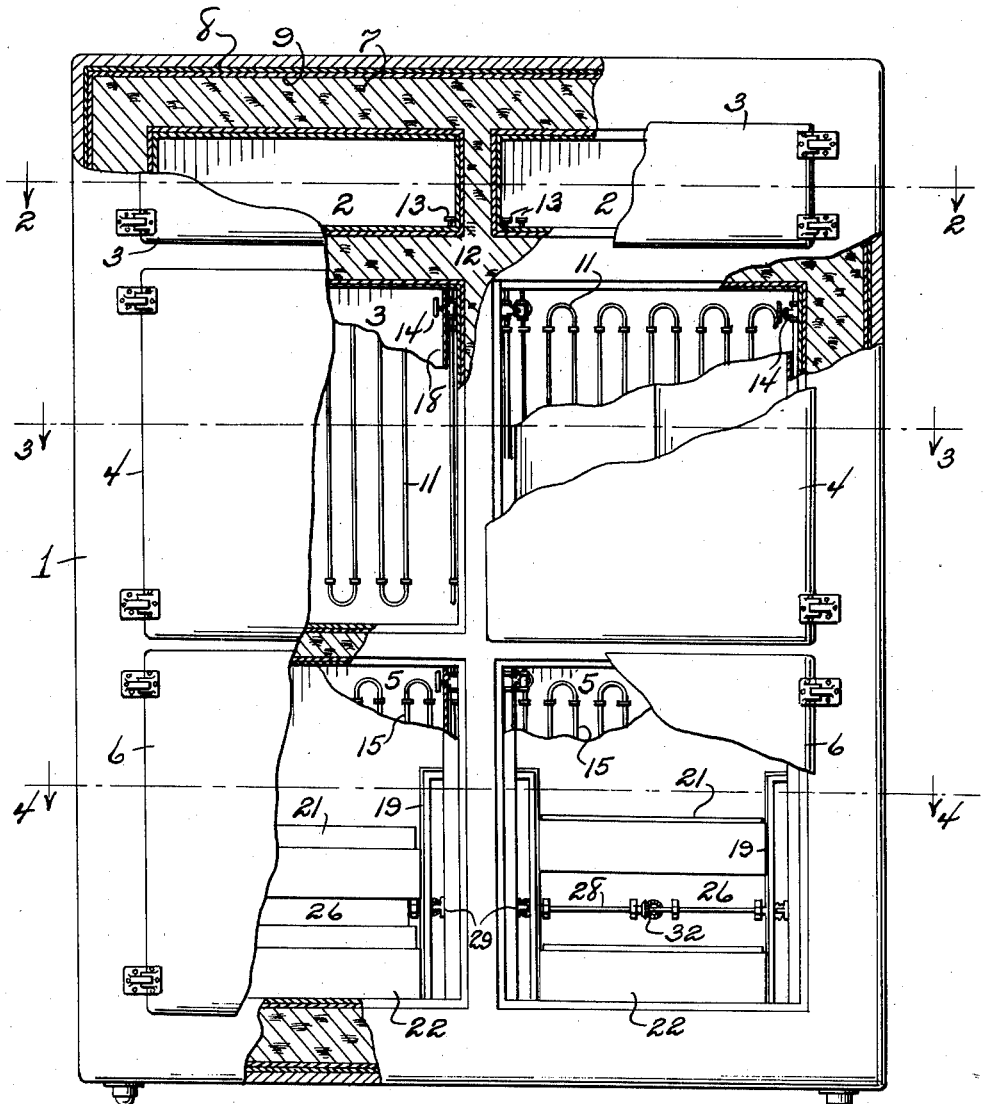

Referring in detail to the drawings, the numeral 1 indicates a heat resisting cabinet or casing having formed in the upper portion thereof storage chambers 2 adapted to receive pieces of solid carbon dioxide for cooling and freezing purposes and the chambers are closed by hinged front doors 3. Immediately below the chambers 2 are cooling chambers 3 closed by hinged doors 4 in which frozen articles and other articles requiring low temperatures may be stored. Freezing chambers 5 are arranged below the cooling chambers 3 in the lower portion of the cabinet or casing 1 and are closed by hinged doors 6.

The chambers 2 receive sufficient heat through the wall 12 and also by the opening and closing of the doors to said chambers for causing the solid carbon dioxide to sublime.

The cabinet or casing is built upon either steel or wooden frames or both and insulated with pure cork board 7 with layers of pressed wood 8 on the inside and outside of the cork board and is additionally sealed inside and outside with preferably twenty-four gauge pure iron galvanized as shown at 9 with all seams riveted and soldered. The doors 3, 4 and 6 are of the same construction with double rabbets as shown at 10 and equipped with suitable gaskets to provide absolute air-tight connections between the doors and the cabinet or casing.

Cooling coils 11 are suitably secured to the inner walls of the chambers 3 and extend through the partition walls 12 located between the chambers 3 and 2 and have one of their ends in communication with the interior of the chambers 2 as shown at 13 while their opposite ends communicate with the interior of the cooling chambers 3 whereby the cooling gases or fumes cast off by the solid carbon dioxide located in the chambers 2 may enter the cooling chambers 3. The coils are preferably arranged in the cooling chambers 3 at their side and rear walls and each coil is equipped with a control valve 14 whereby the temperature within the cooling chambers may be regulated. Cooling coils 15 similar in construction to the coils 13 are located in the freezing chambers 5 with one of their ends in communication with the interior of said freezing chambers while their opposite ends communicate with the storage chambers 2 so as to receive cooling fumes or gases therefrom and each is provided with a control valve 16 whereby the temperature in the freezing chambers may be regulated. When not employing the freezing chambers 5 for freezing purposes, they may also be used for cooling articles or materials that need low temperatures and also in which frozen articles may be stored after being frozen should the capacity of the cooling chambers 3 be insufficient. The cooling coils 15 are arranged within the freezing chambers 5 similar to the coils 13 in the chambers 3 so as not to interfere with the freezing apparatus which will be hereinafter more fully described.

The cooling chambers 3 may be divided into separate compartments by partitions 17, if desired, and the cooling coils may have a suitable lining 18 placed thereover for the purpose of preventing the articles placed within the chambers from coming in direct contact with the coils, however, it is to be understood that the linings are so arranged that the cooling effect of the coils will not be materially interfered with.

Vertical guides 19 are located within the freezing chambers 5 and slidably receive rack bars 20 secured to upper freezing racks or trays 21 located directly above the lower freezing racks or trays 22, which are firmly mounted on the bottom walls of the freezing chambers 5. The racks or trays 21 and 22 include telescopic sections 23 adapted to slide freely one within the other and to form within each frame or tray a compartment 24 to receive pieces or blocks of solid carbon dioxide 25 which have been removed from the storage chambers 2. The upper sections of each tray or rack are supported in an elevated position by the blocks of solid carbon dioxide 25 as clearly shown in Figure 5 with the top walls of the lower racks or trays and the bottom walls of the upper racks or trays form therebetween freezing spaces 26 whereby freezing frames forming the subject-matter of the co-pending application, above referred to, are positioned for the purpose of freezing the contents thereof. The lower walls of the upper trays or racks and the upper walls of the lower trays or racks being in direct contact with the blocks of solid carbon dioxide will be chilled to a very low temperature and transmit to the freezing frames the necessary temperature to freeze the contents contained within the frames.

Figure 2:
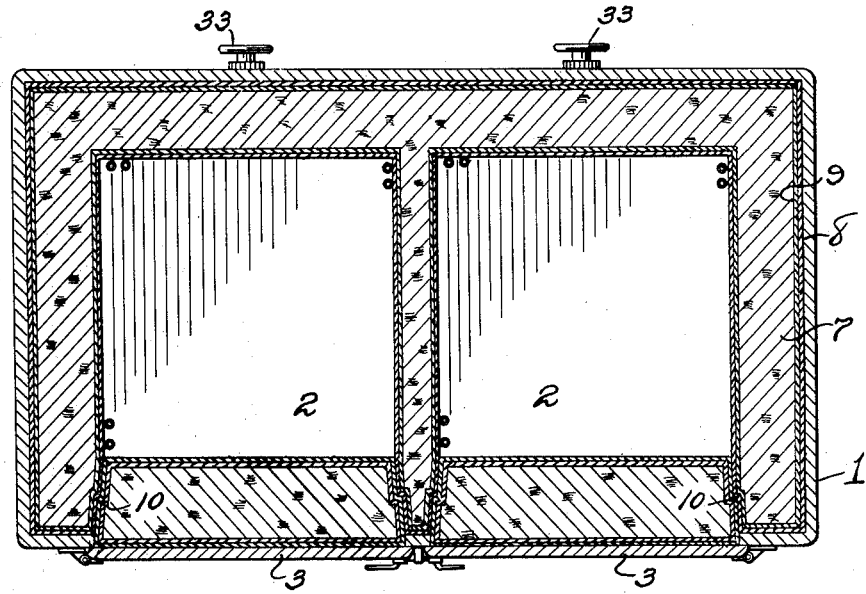
Figure 2 is a sectional view taken on the line 2—2 of Figure 1, illustrating the storage chambers for the solid carbon dioxide.
Figure 3:
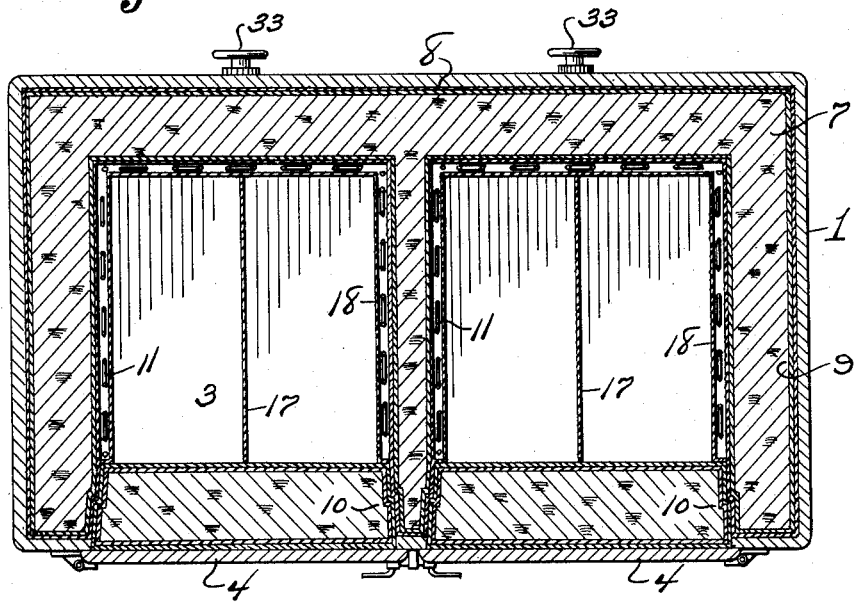
Figure 3 is a sectional view taken on the line 3—3 of Figure 1, illustrating the cooling or receiving chambers.
Figure 4:
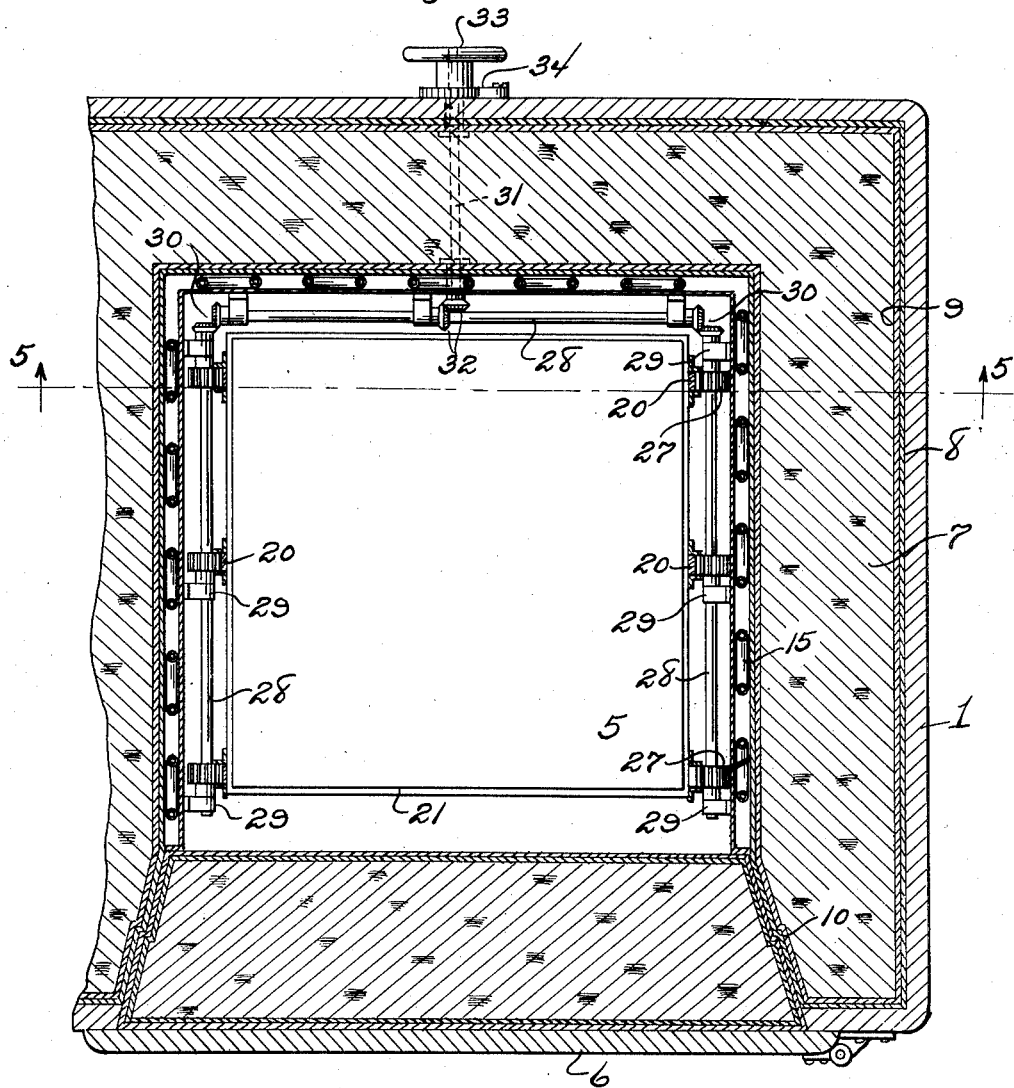
Figure 4 is a sectional view taken on the line 4—4 of Figure 1, illustrating the freezing chamber with the adjustable racks, and the means of operating said racks.

The lower sections of the upper racks or trays are secured to the rack bars 20 and the latter are in mesh with pinions 27 secured to shafts 28 journalled in bearings 29 carried by the walls of the freezing chambers 5. The several shafts 29 are connected at their adjacent ends by gears 30 and which shaft assembled as shown in Figure 4 is connected to an operating shaft 31 extending through the wall of the casing or cabinet 1 by gears 32 and the shaft 31 is provided with a hand wheel 33 whereby a person may actuate the shaft assembled for the purpose of raising or lowering the upper trays 21 relative to the lower trays or racks 23. By reference to Figure 2 it will be seen that an operating wheel 33 and an operating shaft 31 are provided for each of the shaft assemblies located within the freezing chambers 5. Pawl and ratchet mechanisms 34 are applied to the operating shafts 31 whereby the upper trays or racks 21 may be held in any of their adjusted positions, when desired.

The forms or boxes heretofore referred to after having the contents thereof frozen within the compartments 5 are removed and stored within the compartments 3 substantially filling the latter except for the coils, thereby reducing the area of said compartments so that only a very little cubic space within the compartments has to be treated with heat transfer by the coils 11, consequently greatly reducing the amount of refrigeration to keep the compartments 5 at a low temperature.

Each of the compartments is equipped with an automatic release valve which may be regulated to any degree of pressure thereby giving complete control and regulation of the degree of temperature within the compartments. The various compartments may be regulated to different pressures and temperatures enabling different kinds of food products and the like to be held at various temperatures suitable for their required preservation and storage.

The coils 11 and 15 may be equipped with suitable connections for connecting the coils to a mechanical refrigerating device so that these coils may be cooled either by the gases from the solid carbon dioxide or by the mechanical refrigerating medium or by both, if desired.

After a certain evaporation of the solid carbon dioxide in the lower trays or racks 22, the same may be removed and placed in the upper racks or trays and the lower trays replenished by blocks of solid dioxide removed from the storage chambers 2.

By having the upper trays adjustable relative to the lower trays or racks provides means whereby the freezing spaces 26 may be varied as to size or height to accommodate freezing frames of different heights or for other articles to be frozen by being placed within the freezing spaces.

From the foregoing description taken in connection with the accompanying drawings, it will be noted that the temperatures of the compartments 3 and 5 may be easily varied and controlled from the temperature of the storage compartments 2 in which the solid carbon dioxide is stored. Further it will be noted that it is possible to freeze ingredients or articles very rapidly by placing them within the freezing spaces between the upper and lower racks or trays, and also that the racks or trays can be easily replenished with solid carbon dioxide, when necessary.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A combined storage and refrigeration apparatus comprising a cabinet having a chamber, upper and lower trays in said chamber and each including telescopic sections and a freezing space between said trays, said trays adapted to receive solid carbon dioxide, and means for adjusting the upper tray relative to the lower tray.

2. A combined storage and refrigeration apparatus comprising a cabinet having a chamber, a lower tray in said chamber and including telescopic sections, an upper tray slidably mounted in said chamber and including telescopic sections, said trays forming therebetween a freezing space, said trays adapted to receive solid carbon dioxide as a freezing medium, rack bars secured to the upper tray, shaft and gearing mechanism connected to the rack bars and extending outwardly of the cabinet to permit the upper tray to be adjusted relative to the lower tray.

FREDERICK C. HANNAFORD.